F. SNYDER.
CALK FOR HORSESHOES.
APPLICATION FILED MAY 31, 1913.
1,114,925.
Patented Oct. 27, 1914.
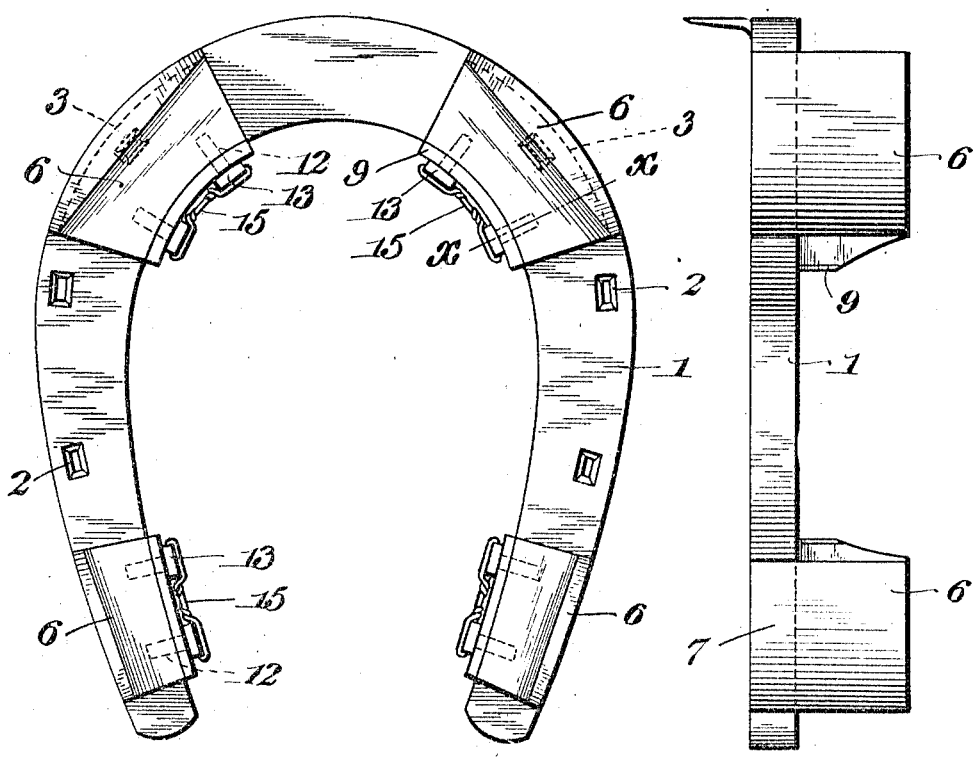
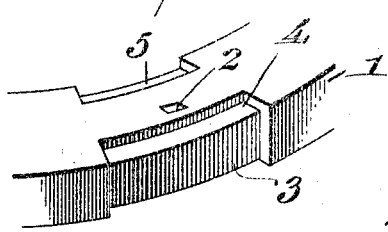
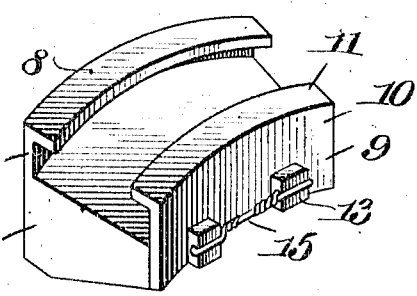
INVENTOR
Frank Snyder.
BY
Joshua R. H. Potts
ATTORNEY

UNITED STATES PATENT OFFICE.

FRANK SNYDER, OF INDIANA, PENNSYLVANIA.

CALK FOR HORSESHOES.

1,114,925.  Specification of Letters Patent.  Patented Oct. 27, 1914.

Application filed May 31, 1913. Serial No. 770,928.

*To all whom it may concern:*

Be it known that I, FRANK SNYDER, a citizen of the United States, residing at Indiana, county of Indiana, and State of Pennsylvania, have invented certain new and useful Improvements in Calks for Horseshoes, of which the following is a specification.

This invention relates to horse shoes, the principal object being to provide a shoe equipped with calks which may be quickly and easily attached to or detached from the shoe of a horse without necessity of the removal of the shoe from the hoof of the animal.

A further object of my invention is to provide a device as above mentioned in which the calks may be applied to the shoe with the least possible danger of derangement, or accidentally becoming detached therefrom, and which is of such construction as to minimize the danger to the animal from injury to its feet and legs from interference.

With these objects in view together with others which will appear as the nature of the invention is better understood, my invention comprises a horse shoe provided at different points in its inner and outer periphery with let in, or notched portions, calks, means upon the calks coöperating with the notched portions upon the shoe to prevent displacement thereof, and means upon the calks for holding the same in position upon the shoe.

My invention further comprises a device characterized as above, the calks being attached to the shoe in such manner that no part of the calk will project beyond the periphery of the shoe to cut or bruise the feet or legs of the animal.

My invention further comprises a device as above stated, the arrangement of the calk notches in the shoe, and the means of assembling the calk therein being such as to permit of the assemblage of the calk while the shoe is upon the foot of the animal.

My invention further consists in the novel arrangements and combinations of parts, all as will be fully described hereinafter and particularly pointed out in the claims.

My invention will be more readily understood with reference to the accompanying drawings in which—

Figure 1 is a bottom plan view of a horse shoe constructed in accordance with my invention and illustrating the calks attached thereto, Fig. 2 is an edge view of the same, Fig. 3 is a detail perspective view of a portion of the horse shoe, the calk being removed therefrom, Fig. 4 is a detail perspective view of one of the calks constructed in accordance with my invention, and Fig. 5 is a sectional view taken substantially upon the line *x—x* of Fig. 1.

Referring now more particularly to the drawings, 1 represents generally a shoe of the usual shape to fit the foot of an animal, and which may be secured to the foot of the animal in any preferred way, openings 2 being provided in the present instance for the reception of the usual nails or spikes.

In carrying out my invention I provide at different points in the outer periphery of the shoe, let in, or notched portions 3, of comparatively shallow depth and of sufficient width to accommodate the securing portion of the calk to be presently described. Upon the upper face of the shoe, that is, the face that will be positioned adjacent the foot of the animal, an inwardly extending notch portion 4 is provided forming a continuation of the notch 3. Upon the upper surface of the shoe, adjacent the inner periphery thereof is an oppositely extending notch or let in portion 5, similar to the notches 4 above mentioned, but substantially narrower. The calks used in connection with a shoe of this construction, comprise, as shown more clearly in Figs. 4 and 5, a body portion 6, of a design to suit the condition of the ground, provided adjacent the outer edges thereof with upwardly extending portions 7, which are formed at their upper extremities with inwardly extending hook members 8. The members 7 and 8 extend the full width of the calk and are adapted to fit within the notched portions 3 and 4 respectively of the shoe. The inner face of the calk is flush with the inner face of the shoe and to securely hold the calk in position upon the shoe, a plate 9 is provided for attachment to the rear face of the calk and adapted to engage the inner face of the shoe. The plate 9 extends upwardly at 10 toward the upper face of the shoe, and is provided with an inwardly extending hook member 11 which rests in the recess or notch 5. Screws 12, provided with heads 13 are secured to the calk 6 through perforations in the plate 9 for the purpose of securing the said plate rigidly to the body portion of the calk, and the said heads 13 are provided with perforations 14 through which a wire or other flexible member 15 is passed and fastened to prevent rotation or displacement of the screws.

It will be obvious that in assembling the device thus constructed it will not be necessary to remove the shoe from the foot of the animal, as the hook member 8 of the body 6 may be readily inserted beneath the hoof of the animal in position within the notch 4. The plate 9 may in a like manner be secured to the inner periphery of the shoe and the screws 12, properly assembled, will prevent the calk from becoming accidentally displaced. It will also be obvious that when the calk is assembled upon the shoe, the engagement of the hook members 8 and the upwardly extending portion 7, of the calk, together with the hook portion 11 of the plate 9 against the adjacent faces of the shoe, will prevent any movement of the calks longitudinally of the shoe. It will still further be seen that the arrangements of the notch portions 3 and 4 in the outer periphery of the shoe will permit of the outer face of the calks being positioned flush with the said outer periphery, and thereby minimize the danger of injury to the feet or legs of the animal from any outwardly extending portions of the calk. When a device is thus assembled and the screws 12 are positioned thereon to hold the plate 9 securely, the device will be prevented from becoming displaced by means of the member 15 threaded through the perforations 14 in the heads of the said screws 12, as clearly shown in Fig. 4 of the drawings.

I claim:—

1. A horse shoe provided at intervals in its upper face adjacent its inner and outer edges with inwardly extending recesses, the said recesses adjacent the outer edge being extended downwardly in the periphery to the under face of the said shoe, the side and inner walls of said recesses being disposed at right angles to the upper face of the shoe, calks, said calks being provided with inner and outer faces, said outer faces being provided with upwardly and inwardly extending hook members adapted to engage within the said recesses upon the outer and upper portion of said shoe, the inner faces of said calks terminating short of the inner edge of the said shoe, a plate of uniform thickness provided at one end with a hook portion adapted to engage within said inner recess of said shoe, said plate being of such thickness as to engage the inner face of said calk when in position upon the shoe, the sides and ends of the portions of said calks and plates fitting within said recesses being disposed at right angles to the body portions thereof to snugly engage the walls of said recesses, and screws for holding said plate in position upon said calk, substantially as described.

2. A horse shoe provided upon its periphery and outer portion of the upper face thereof with notches, the inner edge of the said upper face being also provided with oppositely disposed notches, vertical walls in the said upper face of the said shoe of the same curvature thereof and spaced inwardly from the opposite edges to limit the inward extent of the said notched portions, the said notched portions being limited in their longitudinal extent by vertical inwardly converging end walls, calks, said calks being provided with inner and outer faces, said outer face being provided with an upwardly and inwardly extending hook member, the upwardly extending portion of said hook member being of the same dimension as and adapted to engage within the said notch in the periphery of said shoe, while the inwardly extending hook portion is provided with a curved outer edge and outwardly converging sides to fit snugly within the notched portion in the upper face of said shoe, the inner face of said calk terminating short of the inner edge of said shoe, a plate of uniform thickness provided at one end with a hook portion having a concaved outer face and diverging end walls adapted to engage in the said notch in the inner upper face of said shoe, said plate being of such thickness as to engage the inner face of said calk when in position upon the shoe, and screws for holding said plate in position upon said calk, substantially as described.

In testimony whereof I have signed my name to this specification in the presence of two subscribing witnesses.

FRANK SNYDER.

Witnesses:
M. F. JAMESON,
T. M. BOLVIN.

Copies of this patent may be obtained for five cents each, by addressing the "Commissioner of Patents, Washington, D. C."